(12) United States Patent  
Ruck

(10) Patent No.: US 8,365,426 B2  
(45) Date of Patent: Feb. 5, 2013

(54) COORDINATE MEASURING MACHINE FOR DETERMINING SPATIAL COORDINATES ON A MEASUREMENT OBJECT

(75) Inventor: Otto Ruck, Ellwangen-Pfahlheim (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 19 days.

(21) Appl. No.: 13/198,845

(22) Filed: Aug. 5, 2011

(65) Prior Publication Data

US 2012/0079731 A1 Apr. 5, 2012

Related U.S. Application Data

(63) Continuation of application No. PCT/EP2010/000653, filed on Feb. 3, 2010.

(30) Foreign Application Priority Data

Feb. 6, 2009 (DE) .......................... 10 2009 008 722

(51) Int. Cl.
*G01B 5/004* (2006.01)
*G01B 5/012* (2006.01)

(52) U.S. Cl. ........................................... 33/503; 33/556

(58) Field of Classification Search .................... 33/503, 33/556, 557, 558, 559, 560, 561
See application file for complete search history.

(56) References Cited

U.S. PATENT DOCUMENTS

| 3,831,283 | A | * | 8/1974 | Pagella et al. | .................... 33/559 |
| 4,938,083 | A | | 7/1990 | Gurny et al. | |
| 5,185,936 | A | | 2/1993 | McMurtry | |
| 5,339,535 | A | | 8/1994 | McMurtry et al. | |
| 6,430,828 | B1 | | 8/2002 | Ulbrich | |
| 6,546,640 | B2 | * | 4/2003 | Okada et al. | ..................... 33/503 |
| 6,938,353 | B2 | * | 9/2005 | Rouge et al. | ..................... 33/561 |
| 7,043,848 | B2 | * | 5/2006 | Hollman et al. | ................. 33/556 |
| 7,543,394 | B2 | | 6/2009 | Enderle et al. | |
| 2002/0029485 | A1 | * | 3/2002 | Pettersson | ....................... 33/503 |
| 2006/0112578 | A1 | | 6/2006 | Jordil et al. | |
| 2010/0293800 | A1 | * | 11/2010 | Nakayama et al. | .............. 33/558 |
| 2012/0060385 | A1 | * | 3/2012 | Hunter et al. | .................... 33/503 |
| 2012/0246953 | A1 | * | 10/2012 | Engel | ............................... 33/503 |

FOREIGN PATENT DOCUMENTS

| DE | 101 14 126 A1 | 10/2001 |
| DE | 10 2004 048 095 A1 | 4/2006 |
| DE | 10 2005 043 454 B3 | 5/2007 |
| DE | 60 2004 011 544 T2 | 2/2009 |

* cited by examiner

*Primary Examiner* — G. Bradley Bennett
(74) *Attorney, Agent, or Firm* — Harness, Dickey & Pierce, P.L.C.

(57) ABSTRACT

A coordinate measuring machine for determining spatial coordinates on a measurement object has a frame structure on which a probe head is arranged. The probe head has a probe head sensor system, a body part and a coupling part which can move relative to the body part. The frame structure is designed to move the probe head relative to the measurement object. The probe tool has at least one stylus for making contact with the measurement object, and also has a rotating plate. The stylus is coupled to the coupling part by means of the rotating plate, such that it can rotate. At least one roll motion projection is formed on the body part. The rotating plate can be rolled along this roll motion projection by means of a movement of the coupling part in order to set a defined orientation of the stylus.

18 Claims, 11 Drawing Sheets

COORDINATE MEASURING MACHINE FOR DETERMINING SPATIAL COORDINATES ON A MEASUREMENT OBJECT

CROSS REFERENCES TO RELATED APPLICATIONS

This application is a continuation of international patent application PCT/EP2010/000653 filed on Feb. 3, 2010 designating the U.S., which international patent application has been published in German language and claims priority from German patent application DE 10 2009 008 722.2 filed on Feb. 6, 2009. The entire contents of these prior applications are incorporated herein by reference.

BACKGROUND OF THE INVENTION

The present invention relates to a coordinate measuring machine for determining spatial coordinates on a measurement object, and also to a probe head configured to be used on such a coordinate measuring machine. Moreover, the invention relates to a method of determining spatial coordinates using such a coordinate measuring machine and probe head.

U.S. Pat. No. 6,430,828 discloses a coordinate measuring machine comprising a probe head on which a probe tool having a stylus is arranged. The stylus is attached to the lower free end of a vertically arranged quill. The quill can be moved in a vertical direction such that the probe head can be moved orthogonally to a measurement table used for holding a measurement object. The quill itself is arranged on a cross beam of a gantry, and it can be moved in a first horizontal direction along the cross beam. The gantry can be moved together with the quill in a second horizontal direction such that the probe head overall can be moved in three mutually perpendicular spatial directions. The maximum movement distances of the probe head along the three movement axes define a measurement volume within which spatial coordinates on a measurement object can be determined.

In order to carry out a measurement, the measurement object is arranged on the measurement table. Selected measurement points on the measurement object are then touched with the free tip of the stylus. Spatial coordinates for the touched measurement point can then be determined from the position of the probe head within the measurement volume and from deflections of the stylus relative to the probe head. Geometric dimensions and even the object contour of the measurement object can be determined by determining a plurality of spatial coordinates at different measurement points. One typical field of application for such coordinate measuring machines is the measurement of workpieces for quality control.

The measurement points on a measurement object are often located at a position where access is difficult for the stylus, for example when the depth of a hole arranged at the side of the measurement object is to be determined. In order to access such "concealed" measurement points, it is known to use different probe tools having different styli and/or stylus combinations. For example, there are probe tools in which a stylus is arranged transversely with respect to the spatial z-axis of the coordinate measuring machine. In order to carry out a large number of complex measurement tasks, frequent changes of the styli and/or stylus combinations are often required. This is disadvantageous because a stylus change costs time, and therefore prolongs the measurement time for carrying out the measurement. This is a result in particular of the long movement distance of the probe head, since the probe head is typically replaced at a magazine which is arranged outside the measurement volume. In order to carry out a stylus change, the probe head must be moved out of the measurement volume and must then be returned to the original position. The time required for the change is dependent on the size of the coordinate measuring machine. In addition, flexibility of the available probe tools is restricted, and this leads to a large number of probe tools being required for complex measurements. For example, if the depth of a bore inclined at 45° to the surface of the measurement object is to be determined, a suitable stylus or a suitable stylus combination is required. Furthermore, use of such styli and/or stylus combinations restricts the measurement volume, since the probe head can be moved only until it comes in contact with one of the lateral supports. In the case of long styli, this leads to a major restriction.

U.S. Pat. No. 6,430,828 proposes a coordinate measuring machine having a magazine, which has an apparatus for rotating the probe tool. The rotation is carried out about the spatial z-axis by placing the probe tool together with the stylus and/or the stylus combination in this apparatus, which means it is separated from the probe head, and by rotating it using the apparatus, and then fixing it again to the probe head. This apparatus enables each probe tool to be used in one of several rotated positions. This reduces the number of required probe tools with corresponding styli and/or stylus combinations, since each probe tool can be used in several orientations about the z-axis. This approach also makes it possible to reduce the restriction to the measurement volume caused by the styli. One disadvantage in this case is that the rotation of the probe tool requires that the probe tool is placed into the magazine, as a result of which a long time is still required to move the probe head to the magazine, to place it there and to move it back after picking up again.

DE 101 14 126 discloses a probe head which makes it possible to rotate a probe tool directly on the probe head. For this purpose, a lowering apparatus is provided on the probe head, which lowering apparatus first lowers the probe tool in order to enable rotation. After the lowering process, rotation is carried out by an electric motor, which is provided for this purpose in conjunction with a gearwheel drive. Following the rotation, the probe tool is raised again by the lowering apparatus. One advantage here is the gain in time, since the probe tool need not be moved to a magazine for rotation. This also allows that a counterbalanced state of the probe head can be maintained. One disadvantage, however, is that the probe head must be equipped with a complex lowering apparatus and a motor and gearbox for this purpose. This increases the weight of the probe head, leading to undesirable oscillations on the probe head during movement. Furthermore, this results in the probe head being more complex, resulting in additional complexity in design, production and maintenance.

U.S. Pat. No. 5,185,936 discloses another probe head with a probe tool that can be rotated. The probe tool is magnetically held on the probe head. A holding magnet is arranged at a distance from the probe tool, while the latter is being used. Furthermore, it is connected to a shaft which can be rotated by means of a motor that is provided for this purpose. In order to rotate the probe head, the holding magnet is moved together with the shaft in the direction of the probe tool, as a result of which the probe tool is moved from its position. The probe tool is then rotated by means of the motor. The shaft is then drawn back to its original position, as a result of which the holding magnet is released from the probe tool. The drive motor in the probe head again increases weight and complexity.

SUMMARY OF THE INVENTION

Against this background, it is an object of the invention to provide a coordinate measuring machine which allows to reduce the number of stylus changes required and which decreases the number of probe tools required.

It is another object to provide a probe head with flexible stylus orientations, while weight and complexity of the probe head are kept low.

It is another object to provide a coordinate measuring machine that allows to use the available measurement volume in as efficient a manner as possible.

According to one aspect of the invention, there is provided a coordinate measuring machine for determining spatial coordinates on a measurement object, comprising a probe head having a body part, a coupling part moveable relative to the body part, a probe tool arranged on the coupling part, and a probe head sensor system designed to detect a position of the coupling part relative to the body part, and a frame structure designed to move the probe head relative to the measurement object, wherein the probe tool has at least one stylus for making contact with the measurement object and has a rotating plate via which the stylus is rotatably coupled to the coupling part in order to establish a defined orientation of the stylus relative to the coupling part, and wherein at least one roll motion projection is formed on the body part, with the rotating plate being configured to roll along the roll motion projection as a result of a defined movement of the coupling part relative to the body part, thereby allowing to set the defined orientation of the stylus.

According to another aspect, there is provided a probe head for a coordinate measuring machine for determining spatial coordinates on a measurement object, comprising a body part, a coupling part moveable relative to the body part, a probe head sensor system for detecting a position of the coupling part relative to the body part, and a probe tool coupled to the coupling part, wherein the probe tool has at least one stylus for making contact with the measurement object, wherein the probe tool has a rotating plate via which the at least one stylus is rotatably coupled to the coupling part, said stylus having a defined orientation relative to the coupling part, and wherein a roll motion projection is arranged on the body part, with said rotating plate being configured to selectively roll along the roll motion projection by means of a movement of the coupling part relative to the body part, thereby allowing to set the defined orientation of the stylus.

According to yet another aspect, there is provided a method for determining spatial coordinates on a measurement object, comprising the steps of: providing a probe head having a body part, a coupling part moveable relative to the body part, a probe head sensor system for detecting a position of the coupling part relative to the body part, and a roll motion projection; providing a frame structure designed to move the probe head relative to the measurement object; providing a probe tool coupled to the coupling part, said probe tool comprising at least one stylus for making contact with the measurement object and a rotating plate via which the stylus is rotatably coupled to the coupling part; bringing the rotating plate into contact with the roll motion projection; moving the rotating plate along the roll motion projection by means of a movement of the coupling part relative to the body part in order to set a defined orientation of the stylus relative to the coupling part; touching a measurement point on the measurement object by means of the stylus; and determining spatial coordinates of the measurement point as a function of the position of the probe head relative to the measurement object and as a function of the defined orientation.

The novel coordinate measuring machine and method have the advantages of a probe head with a rotatable probe tool. In contrast to the known approaches, however, the novel coordinate measuring machine does not require complex apparatuses for rotation of the probe tool. In fact, the probe head has a roll motion projection on which the probe tool can be rolled for rotation. For the purposes of this application, the expression "rolling" means that a contact or traction exists between the probe tool and the roll motion projection, and this traction can be produced in particular by friction or by a form fit. It is envisaged that the rotating plate interacts with the roll motion projection in order to rotate the probe tool, by the rotating plate being moved relative to the roll motion projection until contact occurs. An appropriate movement of the coupling part, and therefore of the rotating plate, relative to the roll motion projection then makes it possible to rotate the rotating plate largely without slip on the roll motion projection. The rotation preferably takes place about the spatial z-axis. Rotations about further axes or other axes are likewise feasible. The movement of the coupling part required for rotating the probe tool results from the geometric configuration of the roll motion projection. If, for example, this is provided with a planar rolling plane, then this results in a linear movement parallel to the rolling plane for the coupling part. However, arcuate rolling planes are preferred, which leads to the coupling part carrying out a correspondingly curved movement. The expression "rolling plane" means the area of the roll motion projection which can be used to form a traction connection.

The design of the novel coordinate measuring machine allows a very rapid measurement since, whenever a change is required to the orientation of the probe tool, the counterbalanced state of the probe head is maintained and no movements are required to a magazine for rotation of the probe tool. Furthermore, this results in efficient utilization of the measurement volume, since the probe tool can "pass by" obstructions.

Furthermore, this means that the magazine can be optimally utilized, since the probe tool can be placed in the magazine in its respectively space-saving orientation. This makes it possible to prevent particularly long styli, in particular, from extending over a plurality of magazine spaces.

A further advantage is that rotationally symmetrical parts can be measured without a rotational table, since the orientation of the styli on the probe tool can be directly matched to the respective situation. At the same time, the weight of the probe head can be kept very low, thus making it possible to choose very high movement speed for the probe head.

A further advantage is that already existing probe heads can readily be reequipped with a moving coupling part provided with a roll motion projection. In consequence, the complexity and the weight of the probe head are kept low.

Preferably, it is envisaged that the probe head and/or the probe tool have a catch, which allows secure and high-precision positioning of the probe tool. By way of example, latching balls may be used as a catch, which are arranged in pairs on the probe head and interact with latching rollers arranged on the probe tool, by the latching rollers being arranged such that the probe tool latches in between the latching balls without any play. A uniformly distributed arrangement of at least three latching ball pairs in conjunction with three latching rollers which are arranged in a corresponding manner and form a three-point bearing is particularly advantageous in this case. A plurality of latching positions can be achieved by providing a corresponding plurality of latching rollers on the latching tool. The use of a catch such as this allows the probe tool to be borne securely and reproducibly.

In a preferred refinement, the probe head sensor system has at least one measurement force generator which produces the movement of the coupling part.

In this refinement, a measurement force generator, which is advantageously arranged in the probe head, is used for moving the coupling part. This is done, for example, by passing current through plunger-type coils. This results in at least one core, which is associated with the plunger-type coils, being forced out of the windings of the plunger-type coils, or being forced into the windings, by means of the resultant magnetic forces. The coupling part can be moved by the core being forced out and/or in, by means of an appropriate mechanical connection between the core and the coupling part. Two plunger-type coils are preferably provided, and are arranged orthogonally with respect to one another in order to move the coupling part in two dimensions. In this case, it is advantageous that no additional motor is required, but that existing means are used for movement of the coupling part and therefore for rotation of the probe tool, allowing very accurate movement of the coupling part and therefore of the stylus with respect to the measurement object.

In a further preferred refinement, the roll motion projection is a circular tube surrounding the rotating plate.

In this refinement, the term "circular tube surrounding" means that the circular tube extends around the rotating plate in radial direction, and at least largely surrounds it. In this case, it is advantageous for the internal surface of the circular tube, i.e. the rolling plane, to have a radius which is larger than the radius of the rotating plate. This results in the rotating plate interacting with the rolling plane only when this is desired. Furthermore, this means that the rotating plate can be rotated without any impediment. Particularly if the rotating plate is circular, this provides the capability to rotate the rotating plate continuously by means of a circular movement of the coupling part about the centre point of the circular tube. The rotating plate and the roll motion projection therefore form a gear, by means of which the rotating plate is rotated corresponding to its step-up ratio. This therefore avoids the rotating plate being placed on, and subsequently realigned with respect to, the rolling plane, as would be necessary with a rolling plane that was not continuous.

In a further refinement, the coordinate measuring machine has at least one traction element, such as an O-ring, which is arranged on the outer periphery of the rotating plate or between the rotating plate and the roll motion projection.

In this refinement, the traction element improves the contact force between the rotating plate and the roll motion projection during rotation of the rotating plate, and at the same time acts as a stop when the rotating plate is resting on the roll motion projection. Preferably, materials are provided which produce high friction, such rubber or rubber-like materials. Additionally or as an alternative, the traction element may be a ring having teeth which selectively engage into mating teeth on the roll motion projection. If the traction element is in the form of an O-ring, this additionally results in the advantage that the traction element can be arranged around the rotating plate in the circumferential direction, as a result of which the rotating plate is protected all round, and the continuous movement is continuously supported.

In a further refinement, the probe head and the probe tool comprise an orientation detection apparatus for detecting the orientation of the rotating plate in the rotation direction.

In this refinement, the orientation detection apparatus makes it possible to determine the orientation of the probe tool, when the rotating plate is rotated or when the probe tool has been changed. This helps to prevent collisions with elements outside the measurement volume. Furthermore, the orientation detection apparatus makes it possible to check that the probe tool is exactly held in the catch on the probe head, by verifying the correct position.

In a further refinement, the orientation detection apparatus comprises a plurality of orientation detection elements, in particular electrical identification circuits, which are each associated with a specific orientation of the probe tool, and it comprises at least one sensor which interacts with the orientation detection elements.

In this refinement, the orientation detection apparatus assigns a specific orientation detection element to each orientation of the probe tool, thus making it possible to uniquely identify each orientation. The orientation detection elements are preferably arranged on the probe tool, thus providing the capability to equip each probe tool individually with orientation detection elements. This allows different probe tools to have a different number of orientation detection elements, which meet the requirements of the respective probe tool. When a relatively small number of different orientations are required, it is thus possible to save orientation detection elements. This makes it possible to additionally save mass on the probe tool and components for the orientation detection elements.

The sensor is preferably arranged on the probe head, in particular on the coupling part, such that the orientation and the correct latching of the probe tool can be checked continually during measurement operation of the coordinate measuring machine.

The use of identification circuits as orientation detection elements leads to the capability to store additional information in the identification circuits, such as the type of probe tool or geometric data relating to the probe tool. The identification circuits are preferably in the form of integrated circuits.

In a further refinement, the orientation detection elements are arranged at offset angles with respect to one another in the rotation direction of the rotating plate.

In this refinement, the orientation detection elements are preferably located with uniform angle offsets on an imaginary circular line around the centre point of the rotary movement of the rotating plate during rotation. The appropriate orientation detection elements are therefore automatically guided to the sensor corresponding to the orientation of the rotating plate, when this is arranged in a fixed position with respect to the orientation detection elements.

In a further refinement, the orientation detection elements each have at least two contacts, which are arranged radially one after the other with respect to the rotation direction of the rotating plate.

In this refinement, only the appropriate contact is brought to the associated sensor during rotation. This is particularly advantageous in the case of an electrical connection, for example when the orientation detection elements are in the form of identification circuits, since only one correct electrical connection to the orientation detection elements is possible. In particular, provision is made for two sensors associated with the contacts and in the form of opposing contacts to be used when two contacts are used.

The rotating plate and its current orientation can therefore be identified at any time, even directly after the coordinate measuring machine is switched on, i.e. after a switched-off state. This information makes it possible, for example, to prevent collisions during replacement of the probe tool in the magazine.

In a further refinement, the coordinate measuring machine has a centering pin which is moveably arranged on the coupling part and by means of which the probe tool is coupled to the coupling part.

In this refinement, the rotating plate can be centered on the coupling part by means of the centering pin. Because of the movement capability, the rotating plate can be rotated with the centering pin, thus avoiding the need for a complex bearing for the rotating plate on the centering pin.

A closure is preferably provided on the rotating plate, and interacts with the centering pin. The closure allows secure coupling between the probe tool and the coupling part. In one preferred embodiment, a groove is arranged circumferentially on the centering pin and forms a step which can be clasped and is located within the rotating plate when the rotating plate is coupled to the centering pin. For secure coupling, the rotating plate has at least one locking element, which is associated with the clasping step, engages in the groove and holds the rotating plate by means of the clasping step. This coupling additionally requires an apparatus for disconnection of the rotating plate from the centering pin in order, for example, to allow the probe tool to be changed. This prevents the probe tool from being accidentally thrown away. The groove preferably has a slanted wall thus ensuring secure seating, easy latching in and easy release. Furthermore, the use of a corresponding wall allows the probe tool to be released from the centering pin in the event of a collision, thus reducing or preventing damage to the probe tool and/or to the probe head.

In a further refinement, the moveable centering pin has at least one latching position and at least one rotation position.

In this refinement, the centering pin is preferably arranged such that it can move in its longitudinal direction within the coupling part. In this case, the latching position is that position at which the rotating plate is rotationally fixed to the coupling part. In the rotation position, it is possible to rotate the rotating plate with respect to the coupling part. This is achieved in particular by moving the centering part out of the coupling part in order to reach the rotation position, such that the rotating plate is at a distance from the coupling part. In the rotation position, the rotating plate can then be rotated without any impediment, i.e. without any disturbing influence on the coupling part or for example the catch. In order to reach the latching position, the centering pin in this refinement is retracted into the coupling part, such that the rotating plate rests on the coupling part and is therefore in a position in which it cannot rotate. In particular, the centering pin can be moved outwards in the direction of the z-axis by the force of gravity while, in contrast, appropriate measures are required to move it in. Appropriate measures may comprise, for example, magnetic forces being used to attract the rotating plate together with the centering pin, and/or an appropriate movement of the probe head in the direction of the rotating plate.

In another refinement, the centering pin has at least one conical section, which interacts with at least one bearing element.

In this refinement, the centering pin can either be borne in the bearing element, or can be moved out of the bearing element. A rearward movement then results in the centering pin immediately being aligned correctly for contact with the bearing element, and being borne securely.

In a further refinement, the conical section is mounted without play in the rotation position by means of the bearing element, and is arranged at a distance from the bearing element in the latching position.

In this refinement, the bearing without any play in the rotation position allows high-precision rotation of the probe tool. At the same time, this means that the probe tool can be pressed with a defined pressure against the roll motion projection thus resulting in a permanent tractional connection between the roll motion projection and the rotating plate, which connection remains the same during the rotary movement. This is particularly advantageous when styli and/or stylus combinations are used which have a high eccentric mass, since these can also be oriented exactly by rotation. The arrangement of the conical section at a distance from the bearing element in the latching position means that the rotating plate can be placed precisely on the coupling part, and that no opposing forces and mechanical stresses are produced by the centering pin. This applies in particular in conjunction with a catch as already described above.

In a further refinement, a control unit is provided which produces a sudden movement of the probe head and/or of the coupling part, with said sudden movement moving the probe tool from a position at a distance from the coupling part to a position close to the coupling part.

In this refinement, the mass inertia of the probe tool is used to move the probe tool with respect to the coupling part such that the coupling part can fix the probe tool. The probe tool is preferably fixed by means of an electromagnet which is arranged on and/or in the coupling part. This results in the capability to move the rotating plate into the active area of the magnet, in order to attach it to the coupling part.

It is self-evident that the features mentioned above and those which are still to be explained in the following text can be used not only in the respectively stated combination but also in other combinations or on their own, without departing from the scope of the present invention.

BRIEF DESCRIPTION OF THE DRAWINGS

Exemplary embodiments of the invention will be explained in more detail in the following description, and are illustrated in the drawing, in which.

DESCRIPTION OF PREFERRED EMBODIMENTS

Figure 1:
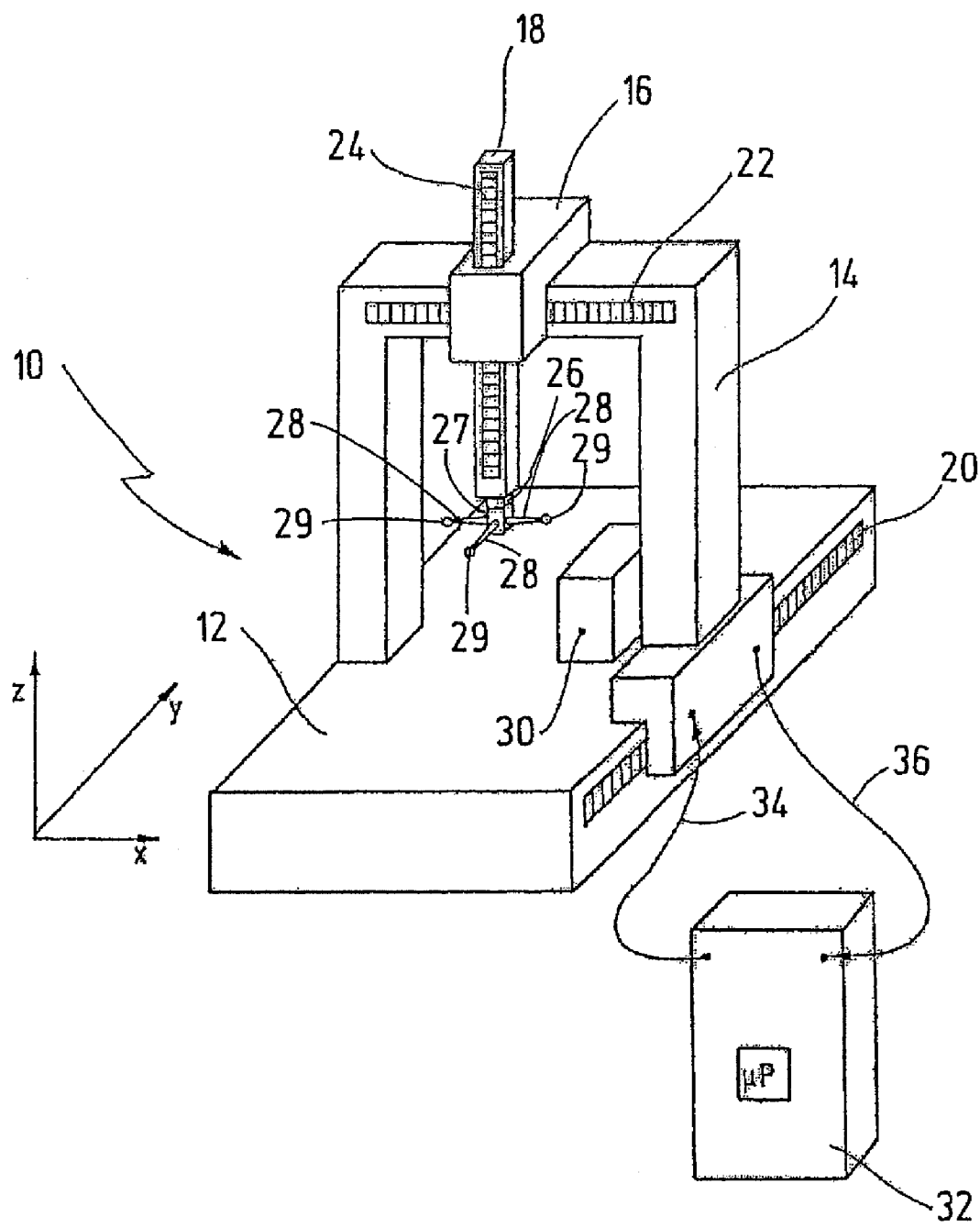
FIG. 1 shows a coordinate measuring machine according to an exemplary embodiment of the present invention.

FIG. 1 shows an exemplary embodiment of the novel coordinate measuring machine in its totality, annotated with the reference number 10. The coordinate measuring machine 10 in this case has a base 12 on which a frame structure 14 is arranged such that it can move in a longitudinal direction. The movement direction of the frame structure 14 relative to the base 12 is normally referred to as the y-axis. A carriage 16 is arranged on the upper lateral support of the frame structure 14 and can be moved in the lateral direction. The lateral direction is normally referred to as the x-axis. The carriage 16 is fitted with a quill 18 which can be moved in the z-direction, i.e. orthogonally to the base 12. Reference numbers 20, 22, 24 denote measurement devices which can be used to determine the position of the frame structure 14, of the carriage 16 and of the quill 18. The measurement devices 20, 22, 24 are typically glass scales, which are read with the aid of suitable sensors.

A probe head 26 is arranged at the lower free end of quill 18 and holds a probe tool 27. In this case, the probe tool 27 has three styli 28, which each have a probe ball 29 at their free ends. These are used to make contact with a measurement point on a measurement object 30. The measurement devices 20, 22, 24 can be used to determine the position of the probe head 26 within the measurement volume while the measurement point is being touched. The spatial coordinates of the touched measurement point can then be determined as a function of this.

Reference number 32 denotes an evaluation and control unit which is connected via lines 34 and 36 to the drives and sensors on the frame structure. The control unit 32 is used to control the motor drives for the movements of the probe head 26 along the three coordinate axes x, y and z. In addition, the evaluation and control unit 32 in this case reads the measured values from the measurement devices 20, 22, 24 and determines the current spatial coordinates of the measurement point and, possibly, further geometric variables relating to the measurement object 30, as a function thereof and as a function of the deflections of at least one of the styli 28.

Figure 2:
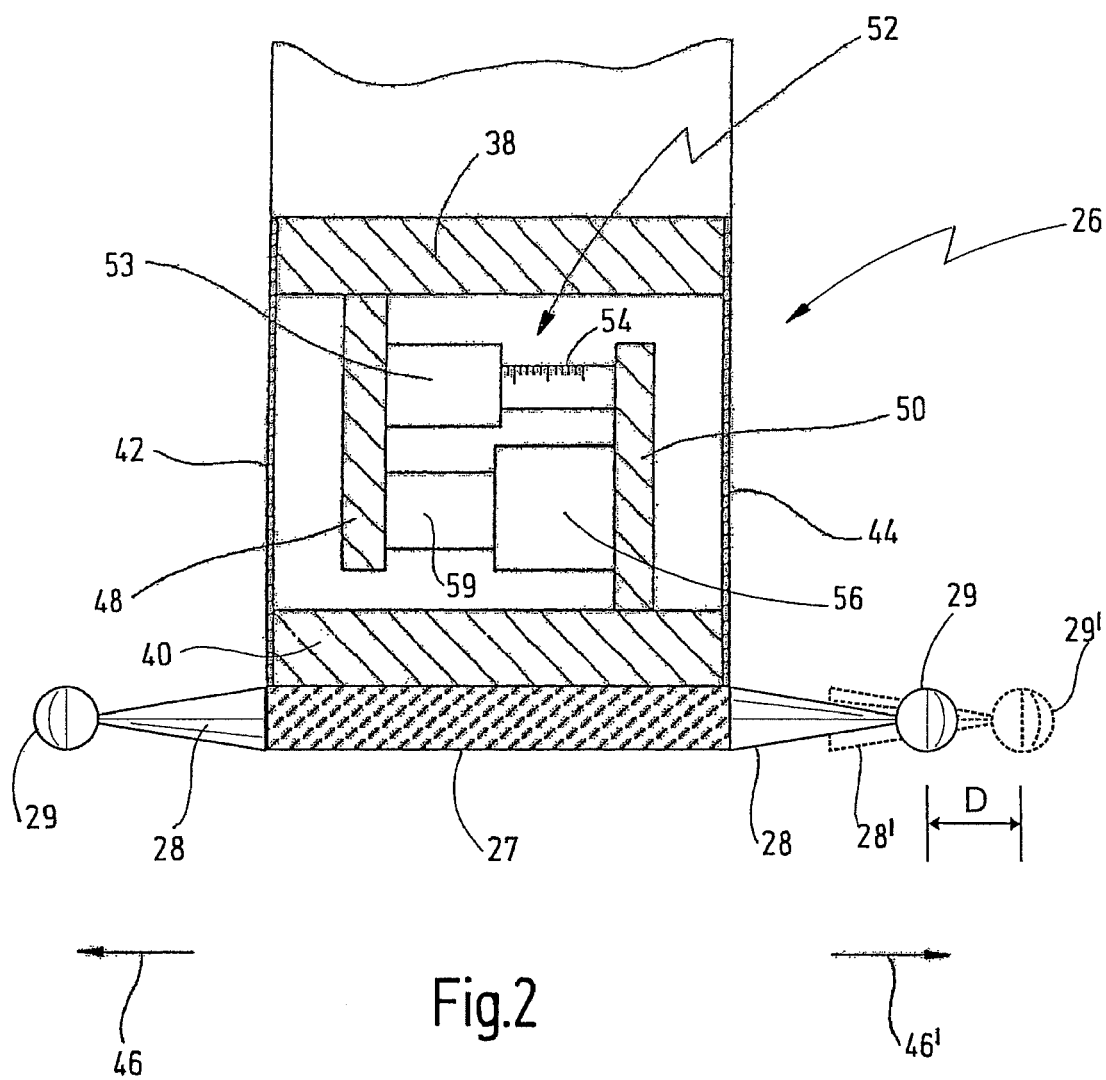
FIG. 2 shows a simplified illustration of a probe head with a probe head sensor system and a measurement force generator.

FIG. 2 uses a simplified, schematic illustration to show the basic method of operation of the probe head 26. The probe head 26 has a body part 38 and a coupling part 40, which are connected to one another via two leaf springs 42 and 44. The leaf springs 42, 44 form a spring parallelogram which allows movement of the coupling part 40 in the direction of arrow 46 (and back in the direction of the arrow 46'). The probe tool 27 together with the styli 28 can thereby be deflected from its rest position through a distance D. The reference numbers 28' and 29' denote one of the styli 28 with the probe ball 29 in the deflected position.

The deflection of the probe tool 27 relative to the body part 38 may be the result of a contact with the measurement object 30 at a measurement point. The deflection of the probe tool 27 is advantageously taken into account in the determination of the spatial coordinates. Furthermore, the deflection of the probe tool 27 in the preferred exemplary embodiments can be produced with the aid of a measurement force generator 56, as will be explained in more detail in the following text. A limb 48, 50 is respectively arranged on the body part 38 and on the moving part 40. The limbs 48, 50 are in this case parallel to the leaf springs 42, 44. In this case, a detector 52 (represented by a scale 54 in this case) and the measurement force generator 56 are arranged between the limbs 48, 50. In this case, the detector 52 has a measurement coil 53 in the form of a plunger-type coil. Alternatively or additionally, a Hall sensor, a piezoresistive sensor or some other sensor may be used as the detector 52, with the aid of which the spatial deflection of the probe tool 27 relative to the body part 38 can be determined. In this case, the measurement force generator 56 is likewise in the form of a plunger-type coil which can be used to pull the two limbs 42 and 50 towards one another or to force them apart from one another, by attraction or repulsion of a core 59.

In the simplified illustration in FIG. 2, the probe head 26 allows the probe tool 27 to be deflected only in the direction of the arrow 46. However, the persons skilled in the art will be aware that a probe head 26 of this kind typically allows a corresponding deflection in two further, orthogonal spatial directions. However, the invention is not restricted to this specific probe head and can also be implemented using different probe heads which have a body part 38 and a coupling part 40 which can move relative thereto.

The persons skilled in the art will be aware that a probe head 26 of the type illustrated in a highly simplified form in FIG. 2 will generally have a holder to which the probe tool 27 is attached such that it can be replaced.

Figure 3:
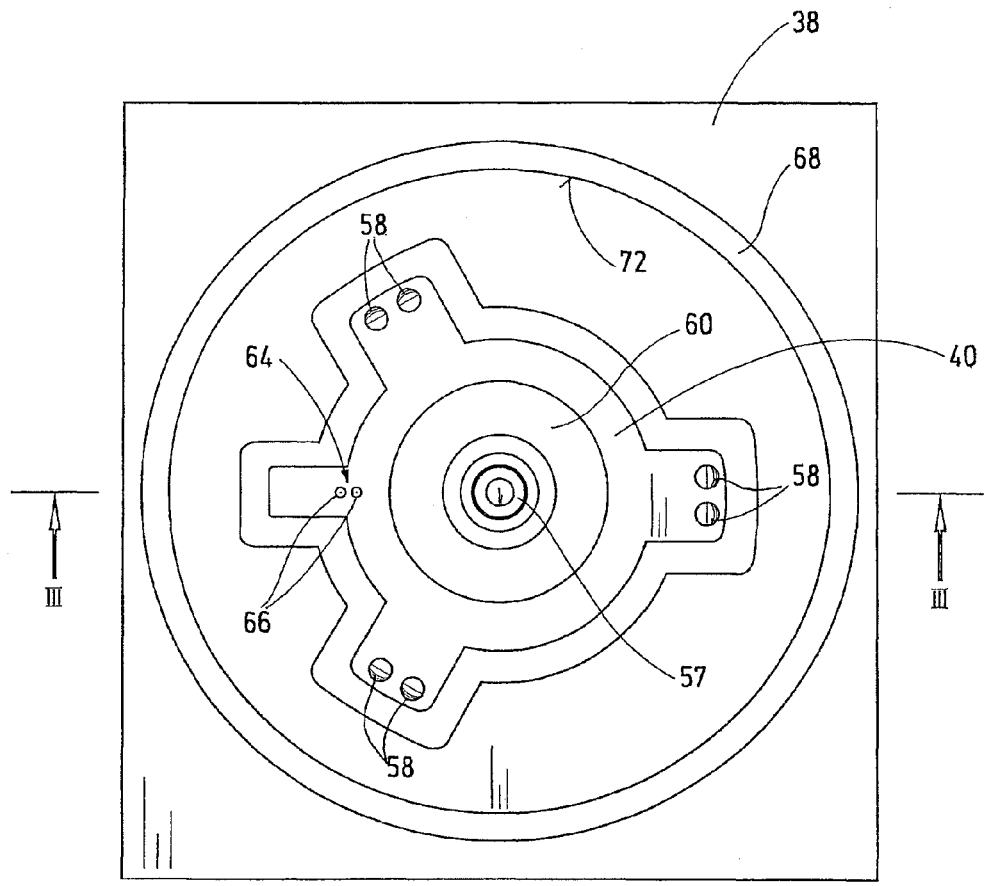
FIG. 3 shows a preferred exemplary embodiment of the probe head for the coordinate measuring machine shown in FIG. 1, in a view of the changing interface.

FIG. 3 shows a preferred exemplary embodiment of the probe head 26 from FIG. 1, in a view from underneath. The body part 38 holds the coupling part 40, which is attached to the body part 38 such that it can move. The coupling part 40 has a central pin 57 which is guided in the coupling part 40 such that it can move in a movement direction orthogonal to the movement direction 46 (this will be explained with reference to FIGS. 8 to 10). Latching balls 58 are arranged in pairs in the edge area of the coupling part 40. The arrangement in pairs is chosen such that the latching ball pairs are each at the same radial distance from the centering pin 57. Furthermore, the latching balls 58 which are arranged in pairs are distributed uniformly with respect to one another on the circumference of the coupling part 40. The coupling part 40 furthermore has a magnet 60, in this case in the form of an annular electromagnet. The electromagnet is arranged concentrically with respect to the centering pin 57 on the coupling part 40. Furthermore, the coupling part 40 has a sensor 64, in this case with two contacts 66. A roll motion projection 68 in the form of a circular tube with an inner tube surface 72 is formed on the body part 38.

Figure 4:
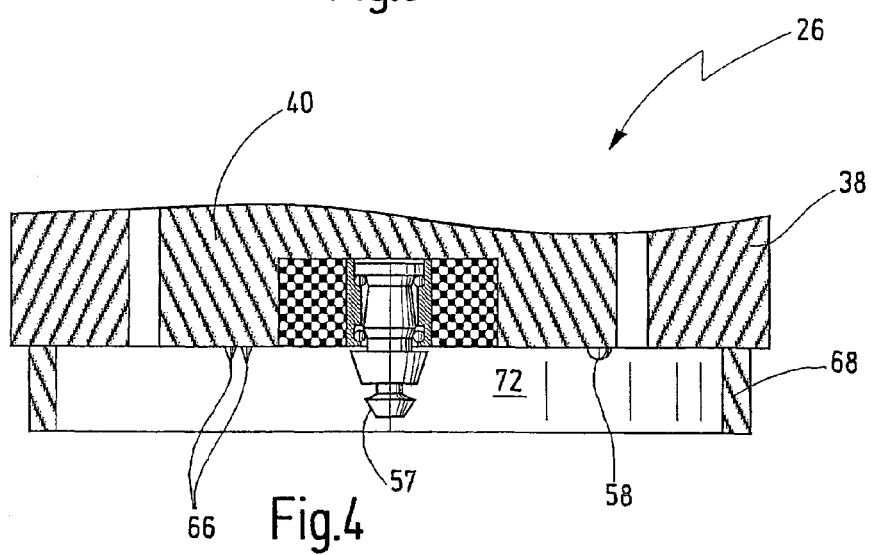
FIG. 4 shows the probe head from FIG. 3, in a section view along the line III-III.

FIG. 4 shows a section through the probe head 26 from FIG. 3, along a section line III-III. For clarity reasons, the lines, holders and spring means associated with the contacts 66 are not shown.

FIG. 4 shows the roll motion projection 68 in the form of a circular tube extended concentrically with respect to the pin 57, resulting in the inner tube surface 72.

Figure 5:
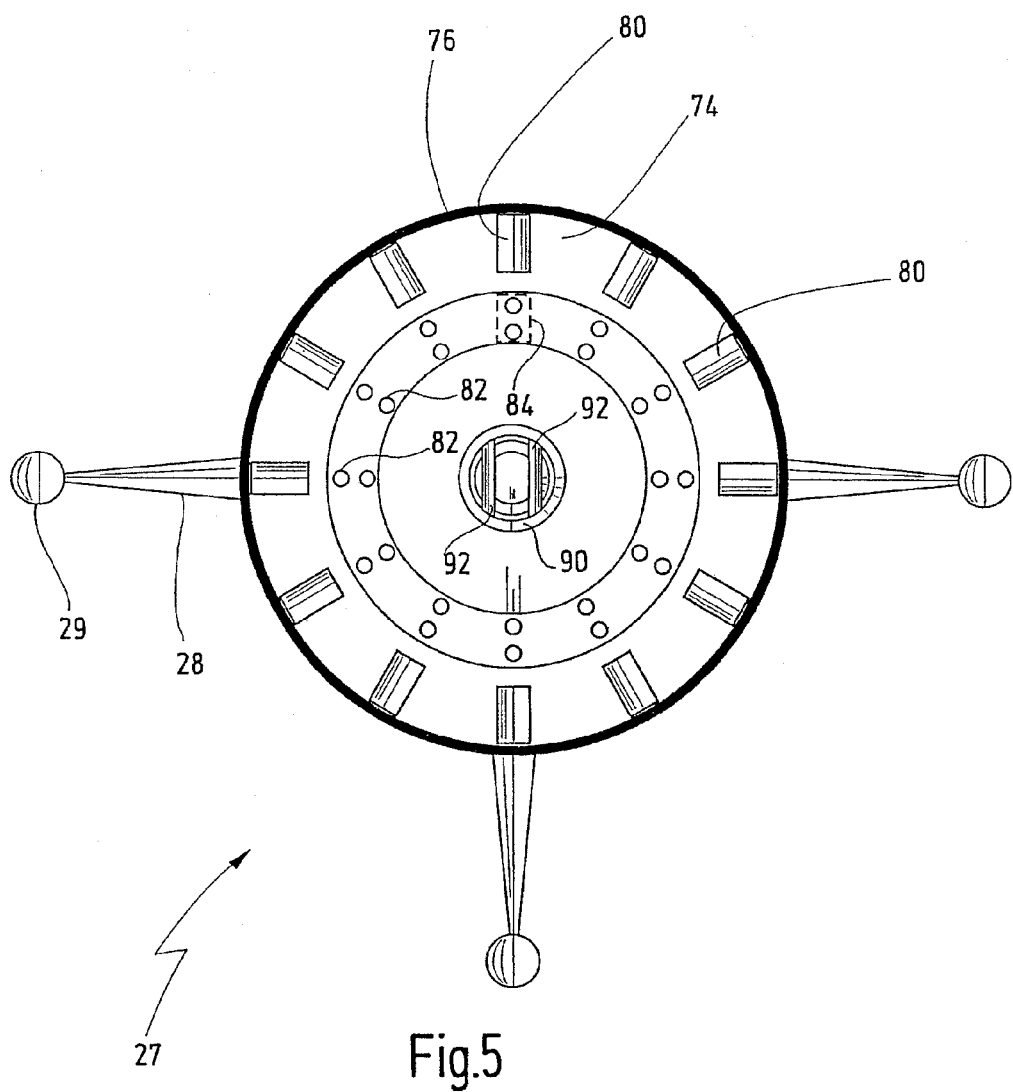
FIG. 5 shows a preferred exemplary embodiment of a probe tool for the coordinate measuring machine shown in FIG. 1, in a plan view of the changing interface.

FIG. 5 shows a plan view of a preferred exemplary embodiment of the probe tool 27. The probe tool 27 has a rotating plate 74, which in this case is circular. A traction element 76 in the form of an O-ring is arranged in the circumferential direction around the rotating plate 74. The O-ring may be made from rubber or a rubber-like material. In other embodiments, the O-ring may be a toothed ring which selectively engages into a toothed inner tube surface. The toothed ring may be integrally formed on the outer periphery of rotating plate 74.

The rotating plate 74 has a plurality of latching rollers 80, which are arranged such that they can rotate radially with respect to the rotating plate 74. The latching rollers 80 are distributed at uniform distances around the circumference of the rotating plate 74. Two contacts 82 are arranged radially internally with respect to each latching roller 80. In this case, the contacts 82 are located one behind the other in the radial direction of the rotating plate 74, thus resulting in an arrangement of contact pairs distributed around the circumference. Each pair is part of an orientation detection element 84 (see also FIG. 8). For clarity reasons, only one of the orientation detection elements 84 has been illustrated, by dashed lines. The orientation detection elements 84 in this case have electrical identification circuits in the form of integrated circuits. Each identification circuit represents unique information relating to the position at which said identification circuit is located on the rotating plate 74. The position of the rotating plate 74 in the circumferential direction can be identified on the basis of this information. Furthermore, at least one identification circuit contains information which represents the identity of the probe tool 27. A holder 90 in the form of a circular cutout is provided at the centre of the rotating plate 74. Two locking elements 92 are arranged within the holder 90.

The probe tool 27 is in this case used on the probe head 26 shown in FIGS. 3 and 4. For this purpose, the holder 90 is designed such that it can hold the lower free end of the centering pin 57, and can lock it by means of the locking elements 92.

The contacts 82 are aligned such that they can each interact in pairs with the contacts 66 on the probe head 26 (FIG. 3). This means that, when the probe tool 27 is arranged on the probe head 26, an electrical contact is made between the contacts 66 and the two contacts 82. This makes it possible to read the information from one and only one identification circuit.

In this case, the probe tool 27 is fitted with the three styli 28 corresponding to FIG. 1. The styli 28 are arranged underneath the rotating plate 74. In this case, the design of the probe tool is not restricted to that shown in FIG. 5. It is possible to use styli of different length and/or geometries. The number of styli used can also be varied.

Figure 6:
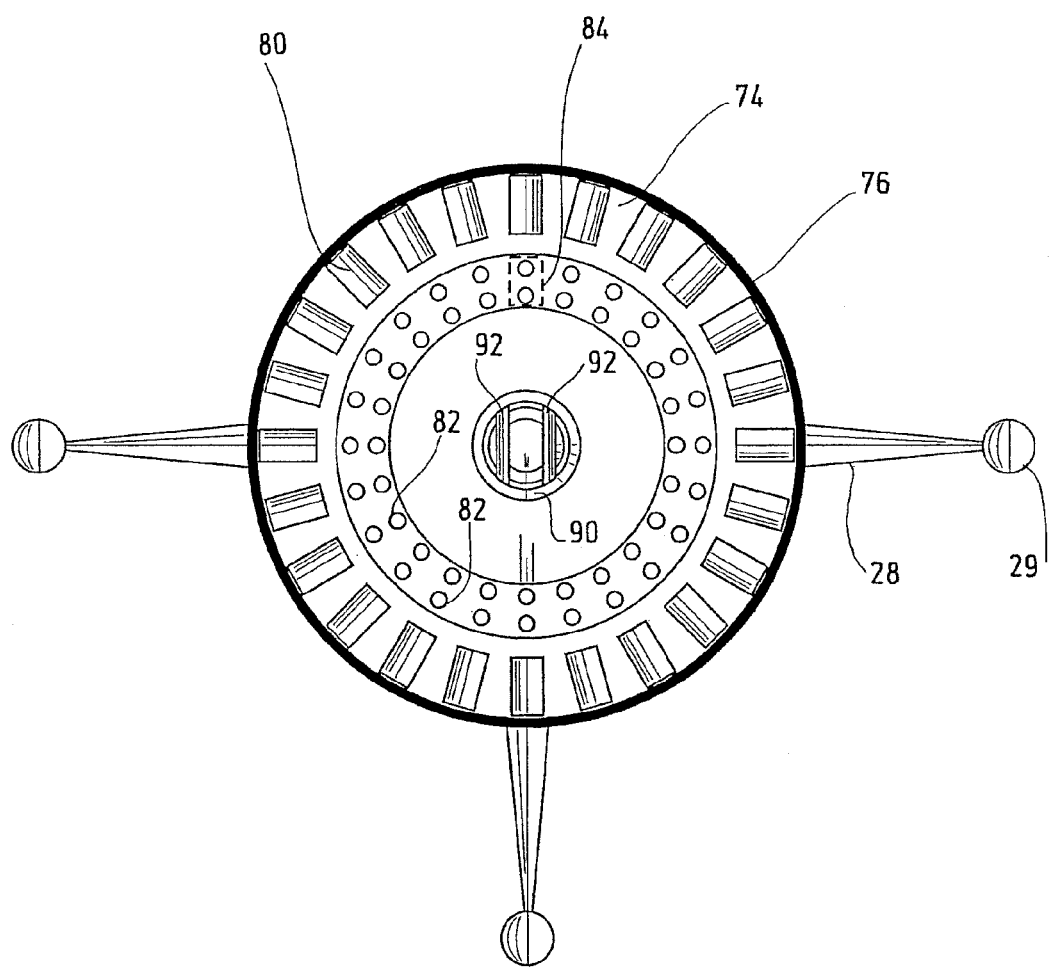
FIG. 6 shows a further exemplary embodiment of a probe tool for the coordinate measuring machine from FIG. 1, in a plan view of the changing interface.

FIG. 6 shows an alternative probe tool 27. In comparison to the probe tool in FIG. 5, further latching rollers 80 and associated contacts 82 and orientation detection elements 84 are arranged on the rotating plate 74.

When the probe tools 27 as shown in FIGS. 5 and 6 are used on the probe head 26 shown in FIGS. 3 and 4, the latching balls 58 together with the latching rollers 80 form a catch. The catch provides secure and reproducible seating as soon as the latching rollers 80 latch in between the latching balls 58, which are arranged in pairs. As a result of the configuration of the coupling part 40, three latching rollers 80 on the probe tool 27 are in each case fixed by a respective pair of latching balls 58 in the circumferential direction of the rotating plate 74, thus resulting in a three-point bearing. The contacts 82 of the orientation detection elements 84 are arranged such that they allow the orientation detection elements 84 to be read, when latched in correctly.

Figure 7:
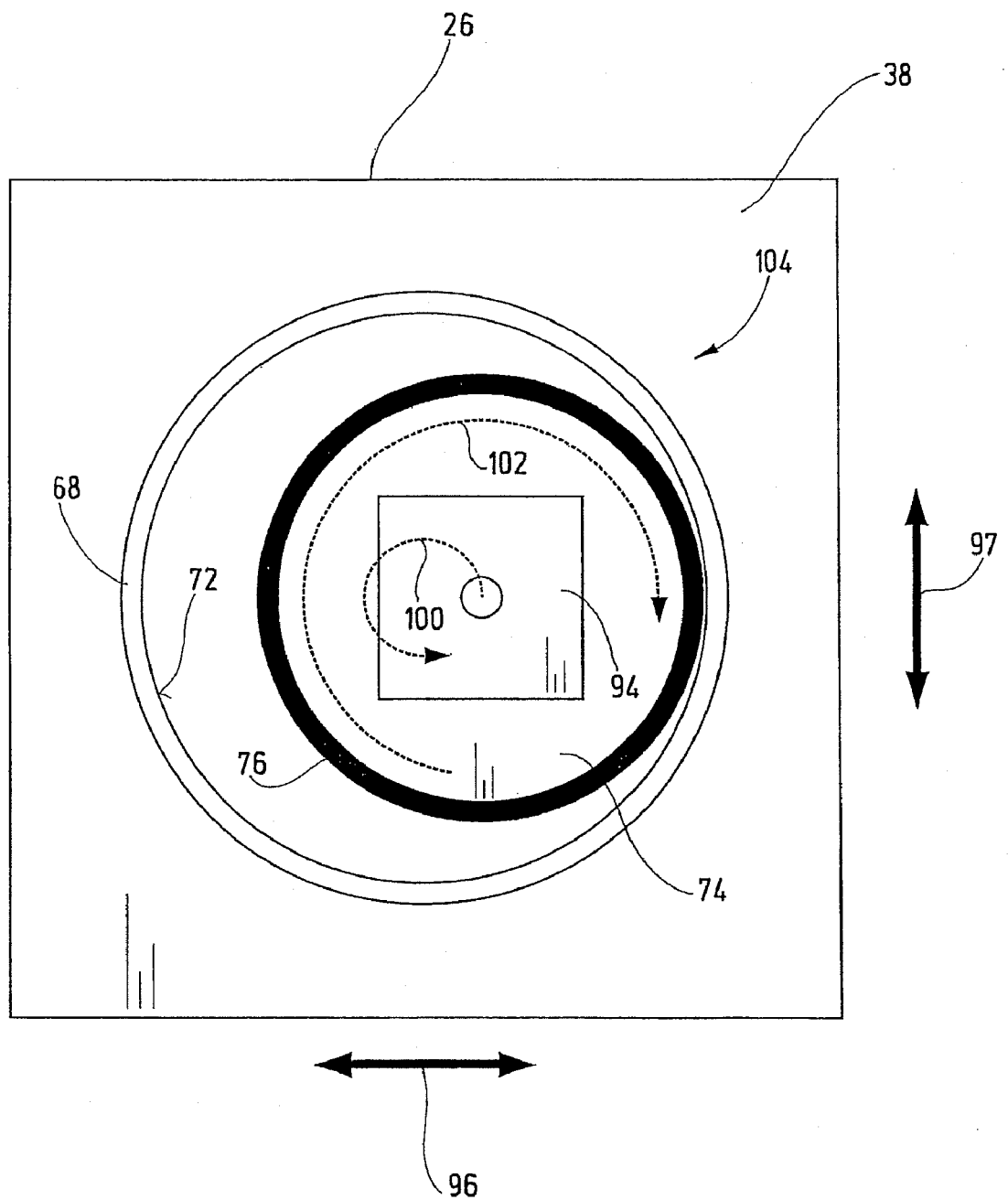
FIG. 7 shows a simplified illustration of a probe head during rotation of the probe tool.

FIG. 7 shows the probe head 26 from FIG. 3 or 4, as well as the rotating plate 74 from FIG. 5, in the form of a simplified illustration from underneath. In this case, the probe head 26 is shown only with the outer contour of the body part 38 and the roll motion projection 68. In this case, the rotating plate 74 is shown with a holding block 94 for styli 28 and the traction element 76. In this case, the measurement force generators 56 are used to move the rotating plate 74 relative to the probe head, and produce measurement forces in the direction of the double-headed arrows 96 and 97. The directions 96 and 97 are mutually orthogonal and in this case correspond to the movement directions x and y of the coordinate measuring machine 10. These measurement forces can be used to move the rotating plate 74 within the roll motion projection 68. In the illustrated position, the rotating plate 74 is resting with the traction element 76 on the tube internal surface 72, and forms a friction lock on the roll motion projection 68.

The rotating plate 74 is rotated in the direction of the arrow 102 by a circular movement (arrow 100) of the rotating plate 74, in this case concentrically with respect to the roll motion projection 68. The circular movement is produced by appropriately controlling the measurement forces along the arrows 96 and 97. The movement 102 is carried out until the stylus is in the desired rotation position. The rotating plate 74 can then be moved back to its central rest position. The rest position is preferably located centrally with respect to the roll motion projection 68. Because of the different radii of the roll motion projection and of the traction element 76, these elements form a friction drive 104 which, if designed appropriately, determines the rotation speed of the rotating plate 74.

Figure 8:
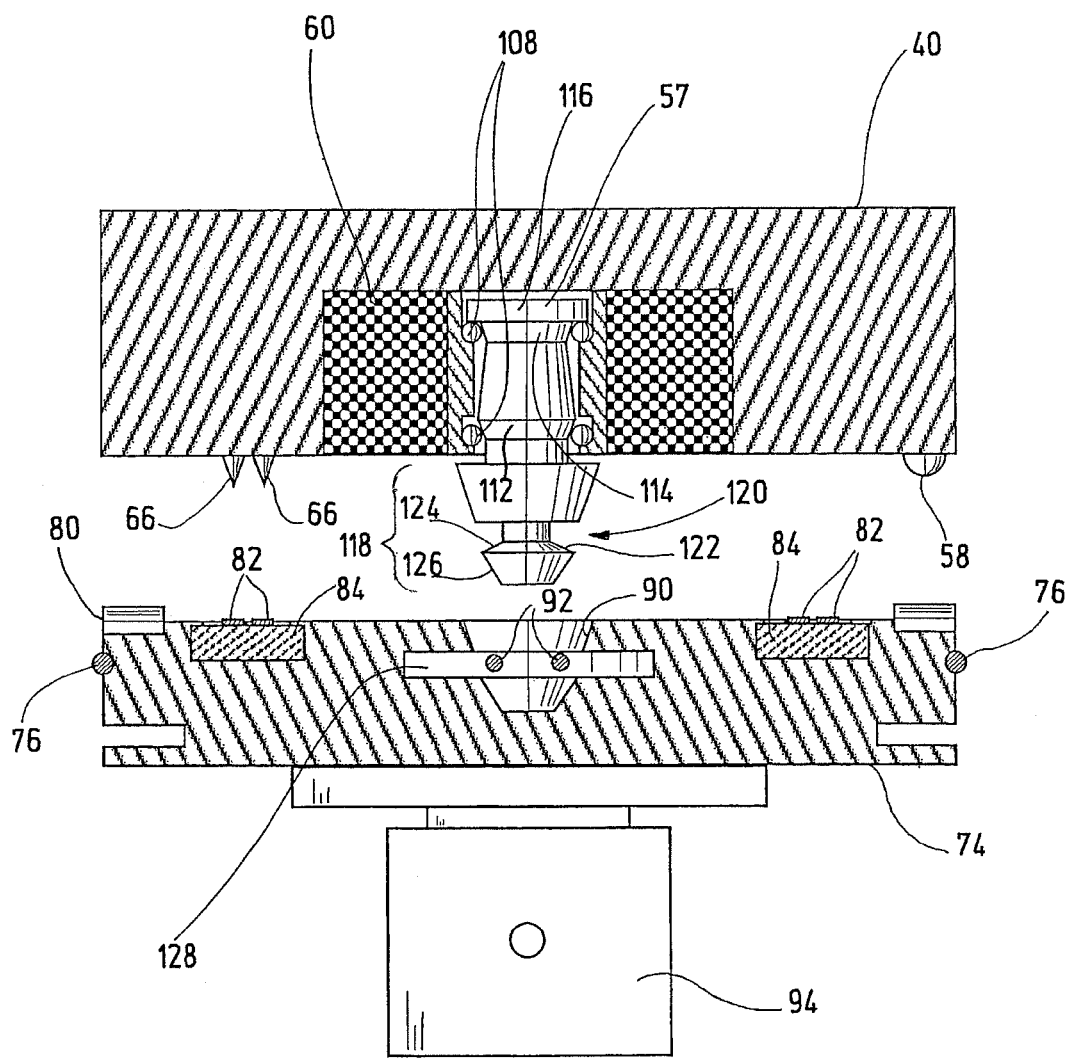
FIGS. 8-10 show the coupling part of the probe head from FIG. 3 in various operating positions, in the form of a section view.

FIG. 8 shows a section view of the coupling part 40 from FIG. 4 and of the rotating plate 74 from FIG. 5, in a first operating position.

The coupling part 40 has the annular magnet 60, which concentrically surrounds a holding apparatus 106. In this case, the holding apparatus 106 has two bearing elements 108 in the form of ball bearings, which are in annular form and are arranged concentrically with respect to the centering pin 57.

The centering pin 57 is arranged within the holding apparatus 106 and has two conical sections 112 and 114. When the centering pin 57 is in the illustrated position, the conical sections 112, 114 rest on the bearing elements 108 without any play. That end of the centering pin 57 which is located within the coupling part 40 forms a holding projection 116, which secures the centering pin 57 against high tensile forces within the holding apparatus 106. That section 118 which is located outside the coupling part 40 is essentially conical. The section 118 has a groove 120 which is formed in the circumferential direction of the centering pin 57. The wall 122 of the groove 120 facing the coupling part 40 forms a further conical section 124, which is oriented in the opposite sense to the conical sections 112 and 114. The free end of the centering pin 57 forms a further conical section 126, whose orientation corresponds to the orientation of the conical sections 112, 114. Furthermore, one of the latching balls 58 and the contacts 66 can be seen here.

The rotating plate 74 is fitted with the traction element 76 in the form of an O-ring. Two latching rollers 80 and two orientation detection elements 84 are illustrated on the side of the rotating plate 74 facing the coupling part 40. The holder 90 is essentially conical, thus ensuring secure seating of the centering pin 57 within the holder 90, and automatic centering. A cylindrical cutout 128, within which the locking elements 92 can be moved, is provided within the holder 90. The rotating plate 74 holds the holding block 94. Styli 28 are not illustrated, for clarity reasons.

Figure 9:
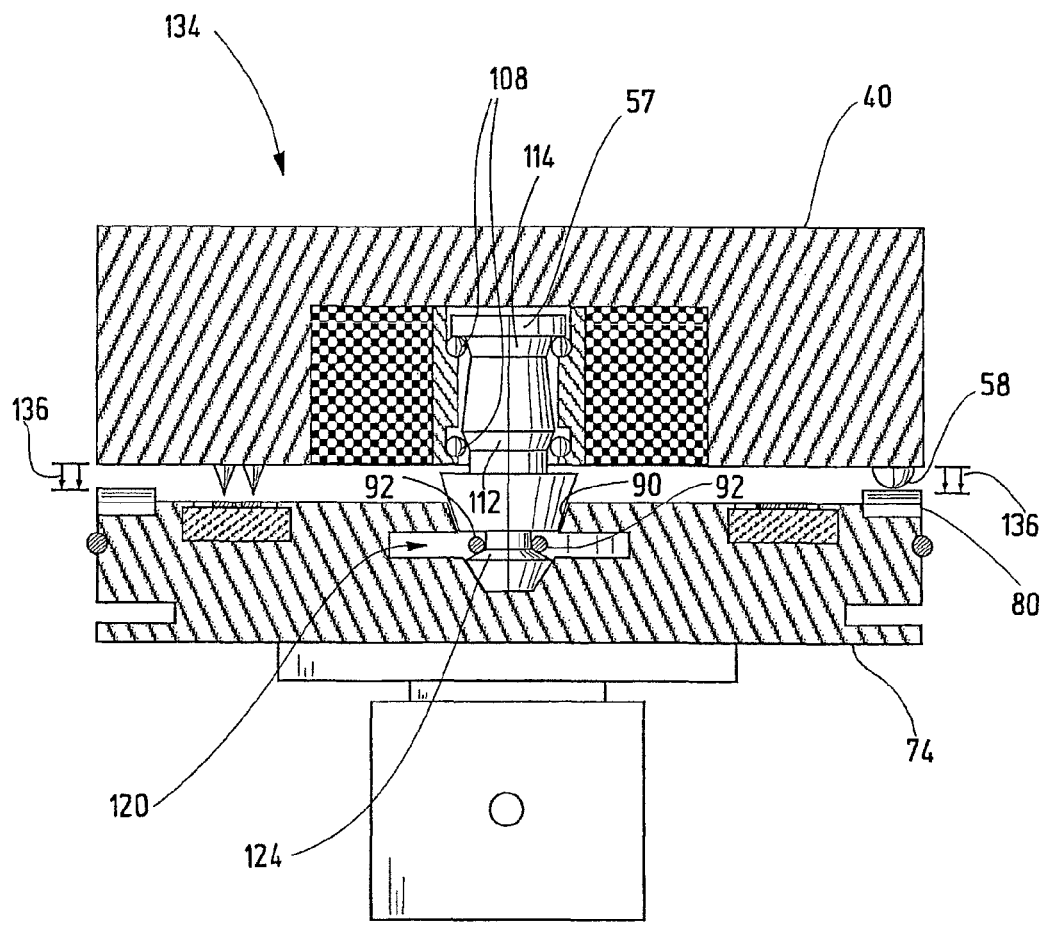

FIG. 9 shows the coupling part 40, the centering pin 57 and the rotating plate 74 in a second operating position. In contrast to FIG. 8, the rotating plate 74 is in this case attached to the centering pin 57. For this purpose, the centering pin 57 is inserted into the holder 90, such that the locking elements 92 engage in the groove 120. The conical section 124 therefore forms a rest for the locking elements 92, and the groove 120, together with the locking elements 92, forms a closure.

When the rotating plate 74 is in the position illustrated here, there is a distance remaining between the latching ball 58 and the next latching roller 80. It is therefore possible to rotate the rotating plate 74 about the centering pin 57. In this case, the conical sections 112 and 114 rest on the bearing elements 108 without any play. The centering pin 57 is therefore located in a rotation position 134 which allows the rotating plate 74 to rotate.

A sudden movement of the coupling part 40 in the direction of the movement arrows 136 (that is to say in the longitudinal direction of the pin) results in the rotating plate 74 being moved from the separated position, as shown in FIG. 9, to a position close to the coupling part 40. A sudden movement such as this is produced by the control unit 32 by abruptly moving the probe head 26 downwards.

Figure 10:
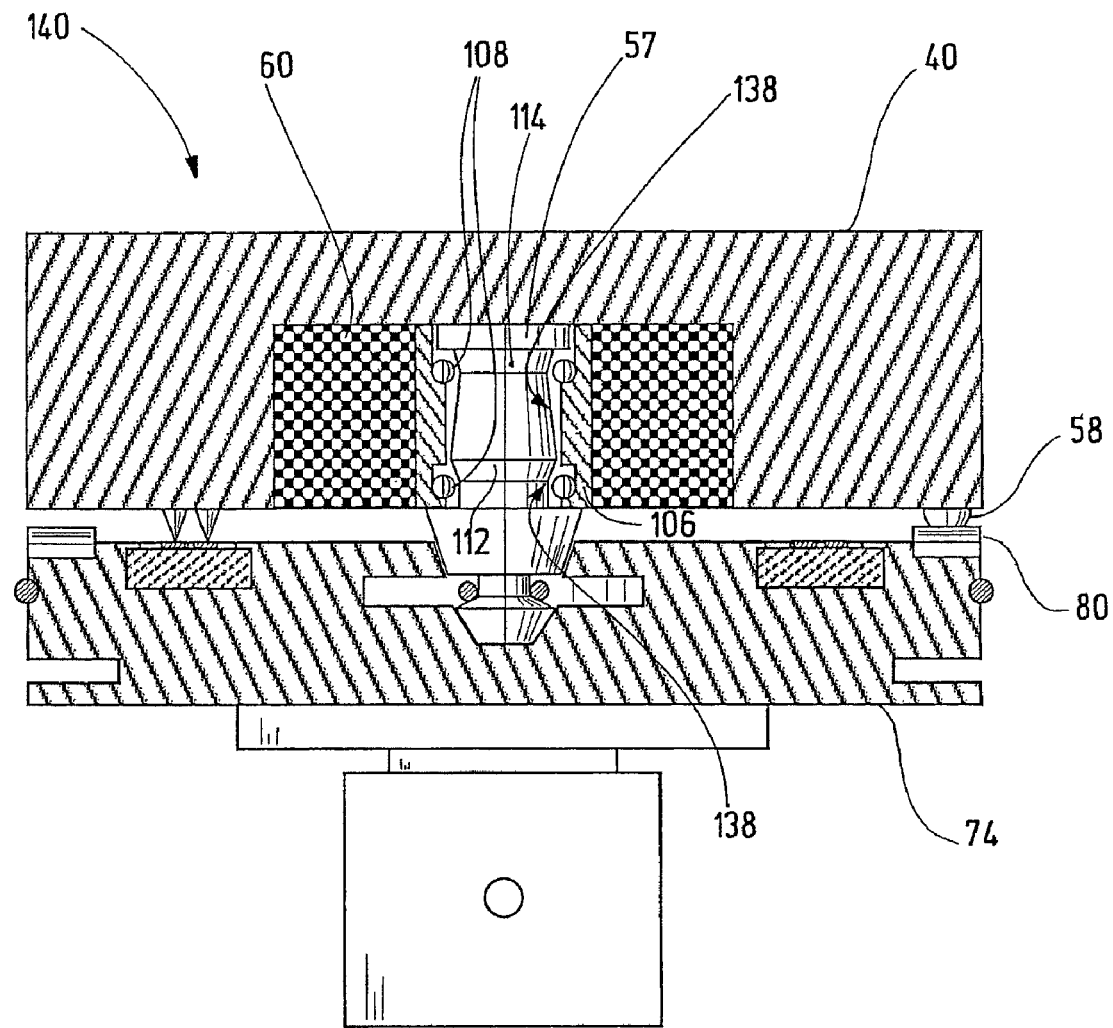

FIG. 10 shows the coupling part 40, the centering pin 57 and the rotating plate 74 from FIGS. 8 and 9 in a corresponding third operating position. In addition, the electromagnet 60 is now magnetized, in order to fix the rotating plate 74 in the position close to the coupling part 40. In this close position, the latching balls 58 interact with the closest latching roller 80, thus resulting in the rotating plate 74 being latched in a defined position.

The conical sections 112 and 114 are now arranged at a distance 138 from the bearing elements 108, by the centering pin 57 being pushed upwards. Because of these distances 138, the centering pin 57 has play within the holding apparatus 106. This prevents the centering pin 57 from producing opposing forces, acting against the orientation of the rotating plate 74 by the latching. The centering pin 57 is therefore located in a latching position 140 which results in reproducible latching with high-precision positioning of the rotating plate 74 with respect to the coupling part 40.

Figure 11:
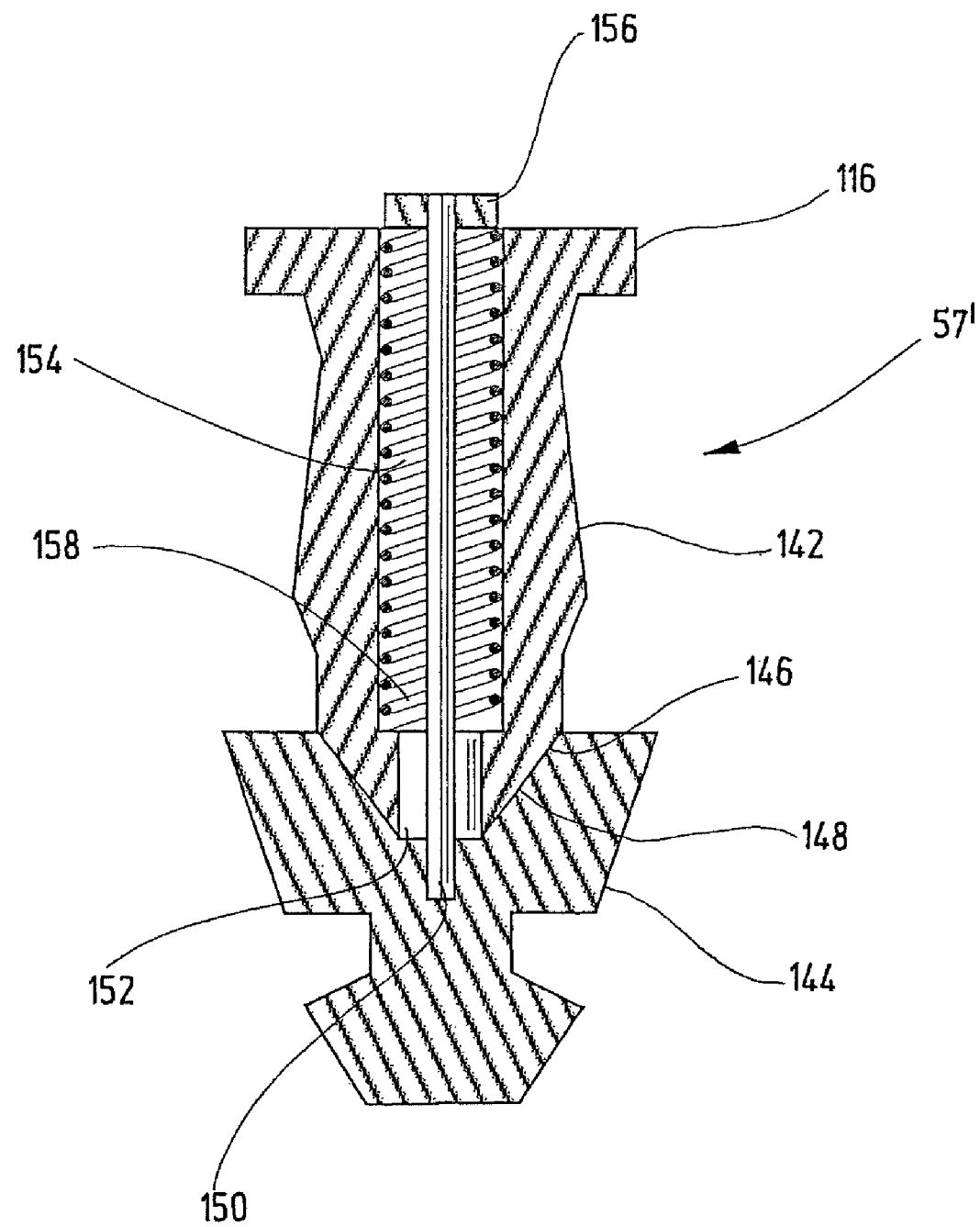
FIGS. 11-12 show an exemplary embodiment of a centering pin in various operating positions, in the form of a section view.

FIG. 11 shows a further refinement of the centering pin 57', in the form of a section. In this case, the centering pin 57' is formed in a plurality of parts and comprises an armature part 142 and a coupling element 144. The armature part 142 has a conical end 146, which in this case is seated in a recess 148 in the form of a truncated cone. The coupling part 144 is firmly connected to a cable 150 which extends through an opening 152 at the end 146 and a spring area 154 through the armature part 142. The cable 150 is connected to a locking washer 156 at the upper end of the armature part 142, in the area of the holding projection 116. A helical spring 158 is arranged within a spring area 154 and produces a spring force between the armature part 142 and the locking washer 156. This results in the coupling element 144 being held on the armature part 142. The locking washer 156 is designed such that it can be pulled into the spring area 154 when force is applied.

Figure 12:
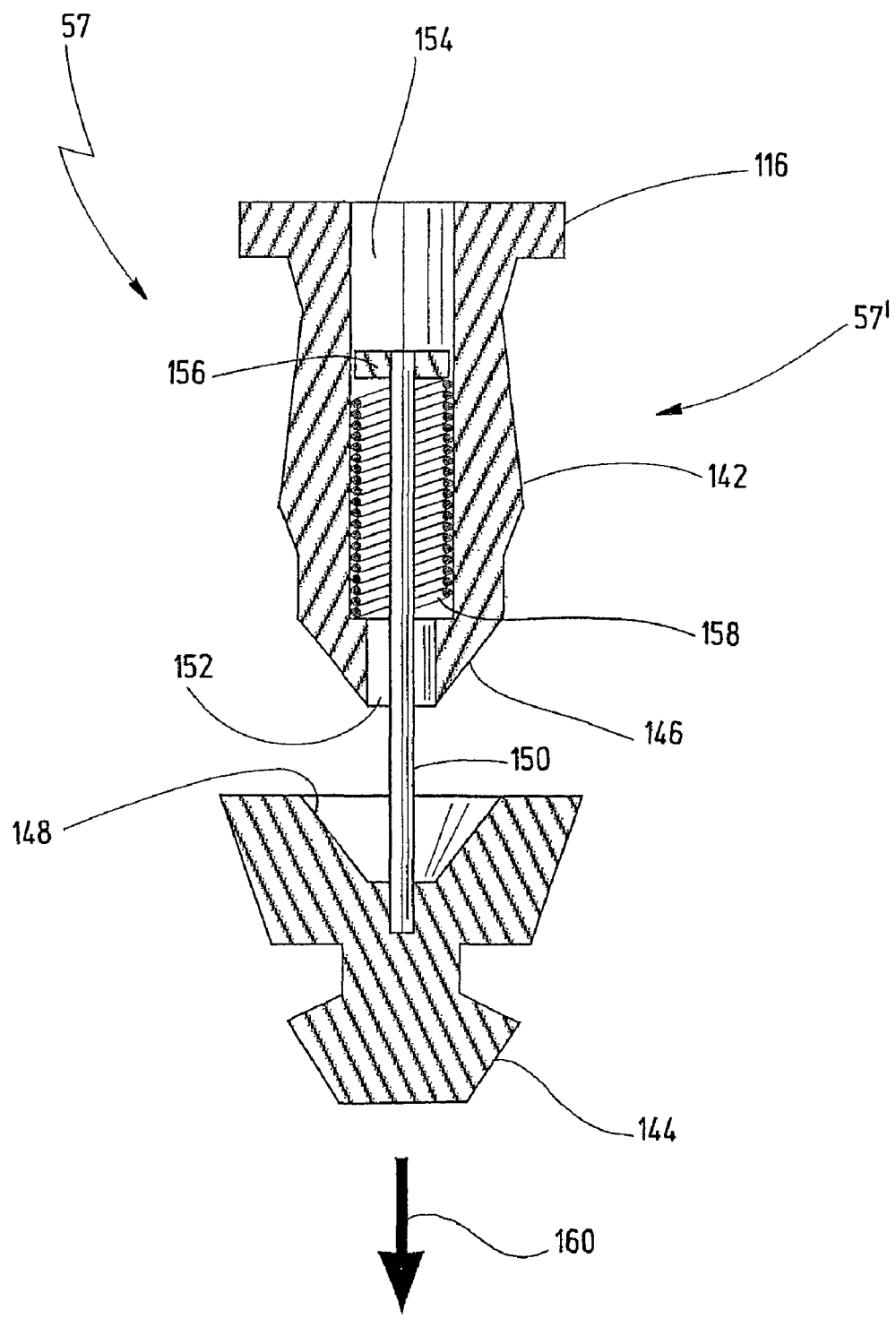

FIG. 12 shows the centering pin 57' in a second position. The second position is the consequence of a force acting on the coupling element 144 in the direction of the arrow 160. This force action results in the locking washer 156 on the cable 150 being drawn into the spring area 154, compressing the helical spring 158.

The embodiment shown in FIGS. 11 and 12 acts as a securing element. When this centering pin 57' is used with a probe tool 27, this results in it being possible for the probe tool 27 to move away from the probe head 26 when an excessively large force acts on the probe tool 27. Particularly if the probe tool 27 collides with the measurement object 30 or with some other obstruction, this reduces or entirely prevents damage to the probe tool 27 and to the probe head 26. It is also possible, on identification of the collision, to gain an additional time period for braking of the probe head 26, since the probe tool 27 can be deflected.

In order to release the rotating plate 74 from the centering pin 57, the locking elements 92 must be moved out of the groove 120. An apparatus which is not illustrated here but is externally accessible is provided for this purpose, thus allowing the locking elements 92 to be moved manually or else in automated form.

In further exemplary embodiments, it is feasible to refine an angular indexing for the positions of the styli in a virtual manner. An appropriate number of equally spaced locking positions is chosen for this purpose. In addition, several styli, which preferably are uniformly designed, are radially arranged on the probe head with respect to a common center point. An angular indexing between the styli (in a circumferential direction around the center point) is selected such that the angular indexing of the styli is different from the angular indexing of the locking positions, and it does not form a multiple of the latter. This allows to position the styli at a plurality of different angular positions. Since the angular positions in circumferential direction, i.e. in the direction of the rotation of the probe head, are not established immediately one following the other, it is advantageous when the corresponding probe head positions and the respective angular positions of the styli are transmitted to a control device. It is thus possible to provide a user with a refined angular indexing, and the probe head can be rotated in an appropriate position by selecting the corresponding angular indexing.

In one exemplary embodiment, it is envisaged that the probe head comprises 24 equally spaced locking positions. These are arranged around a common center point with an angular spacing of 15°. If three equally spaced styli are used, an angular indexing of 120° results for the styli. Due to the uniform design of the styli and the ratio between the angular indexing of the locking positions and the angular indexing of the stylus, a virtual angular indexing of 5° results. In other words, a stylus cannot only be positioned in one of the 24 locking positions, but the three styli can be positioned in 72 different positions.

This basic principle can be established with different resolutions. Preferred examples are: three equally spaced locking positions in addition to four equally spaced styli resulting in a virtual 30° indexing; three locking positions in addition to five styli resulting in a virtual 24° indexing; and six locking positions in addition to a star stylus combination resulting in a 15° indexing. There is also a possibility of using different styli, but the control device should provide an appropriate model for calculating the positions. Due to the virtual indexing, the number of required styli is kept low, which allows to minimize effort for calibration. In summary, an increased flexibility is therefore achieved, when the corresponding probe head is used.

What is claimed is:

1. A coordinate measuring machine for determining spatial coordinates on a measurement object, comprising:
a probe head having a body part, a coupling part moveable relative to the body part, a probe tool arranged on the coupling part, and a probe head sensor system designed to detect a position of the coupling part relative to the body part, and
a frame structure designed to move the probe head relative to the measurement object,
wherein the probe tool has at least one stylus for making contact with the measurement object and has a rotating plate via which the stylus is rotatably coupled to the coupling part in order to establish a defined orientation of the stylus relative to the coupling part, and
wherein at least one roll motion projection is formed on the body part, with the rotating plate being configured to roll along the roll motion projection as a result of a defined movement of the coupling part relative to the body part, thereby allowing to set the defined orientation of the stylus.

2. The coordinate measuring machine of claim 1, wherein the probe head sensor system has at least one measurement force generator configured to produce the defined movement of the coupling part relative to the body part.

3. The coordinate measuring machine of claim 1, wherein the roll motion projection surrounds the rotating plate at least partially.

4. The coordinate measuring machine of claim 1, wherein the roll motion projection is a circular tube.

5. The coordinate measuring machine of claim 1, further comprising a traction element arranged between the rotating plate and the roll motion projection.

6. The coordinate measuring machine of claim 5, wherein the traction element is an O-ring.

7. The coordinate measuring machine of claim 5, wherein the traction element is made from rubber or a rubber-like material.

8. The coordinate measuring machine of claim 5, wherein the traction element is a toothed ring arranged on an outer periphery of the rotating plate.

9. The coordinate measuring machine of claim 1, wherein the probe head and the probe tool together comprise an orientation detection apparatus for detecting the defined orientation of the stylus.

10. The coordinate measuring machine of claim 9, wherein the orientation detection apparatus comprises a plurality of orientation detection elements, which are each associated with a defined orientation of the stylus, and comprises at least one sensor which interacts with the orientation detection elements.

11. The coordinate measuring machine of claim 10, wherein orientation detection elements are electrical identification circuits.

12. The coordinate measuring machine of claim 10, wherein the orientation detection elements are arranged at offset angles with respect to one another in a rotation direction of the rotating plate.

13. The coordinate measuring machine of claim 10, wherein the orientation detection elements each have at least two contacts which are arranged radially one after the other on the rotating plate.

14. The coordinate measuring machine of claim 1, wherein the coupling part comprises a centering pin designed for holding the probe tool, said centering pin being moveable between a rotation position allowing rotation of the rotating plate and a latching position blocking rotation of the rotating plate.

15. The coordinate measuring machine of claim 14, wherein the centering pin has a conical section and the coupling part further comprises a bearing element, with the conical section being mounted without play in the rotation position by means of the bearing element, and with the conical section being arranged at a distance from the bearing element in the latching position.

16. The coordinate measuring machine of claim 14, further comprising a control unit configured to produce a sudden movement of the coupling part, said sudden movement moving the centering pin from the rotating position to the latching position.

17. A probe head for a coordinate measuring machine for determining spatial coordinates on a measurement object, comprising:

a body part,
a coupling part moveable relative to the body part,
a probe head sensor system for detecting a position of the coupling part relative to the body part, and
a probe tool coupled to the coupling part,
wherein the probe tool has at least one stylus for making contact with the measurement object, and
wherein the probe tool has a rotating plate via which the at least one stylus is rotatably coupled to the coupling part, said stylus having a defined orientation relative to the coupling part, and
wherein a roll motion projection is arranged on the body part, with said rotating plate being configured to selectively roll along the roll motion projection by means of a movement of the coupling part relative to the body part, thereby allowing to set the defined orientation of the stylus.

18. A method for determining spatial coordinates on a measurement object, comprising the steps of:

providing a probe head having a body part, a coupling part moveable relative to the body part, a probe head sensor system for detecting a position of the coupling part relative to the body part, and a roll motion projection,
providing a frame structure designed to move the probe head relative to the measurement object,
providing a probe tool coupled to the coupling part, said probe tool comprising at least one stylus for making contact with the measurement object and a rotating plate via which the stylus is rotatably coupled to the coupling part,
bringing the rotating plate into contact with the roll motion projection,
moving the rotating plate along the roll motion projection by means of a movement of the coupling part relative to the body part in order to set a defined orientation of the stylus relative to the coupling part,
touching a measurement point on the measurement object by means of the stylus, and
determining spatial coordinates of the measurement point as a function of the position of the probe head relative to the measurement object and as a function of the defined orientation.

* * * * *